United States Patent Office 3,199,360
Patented Aug. 10, 1965

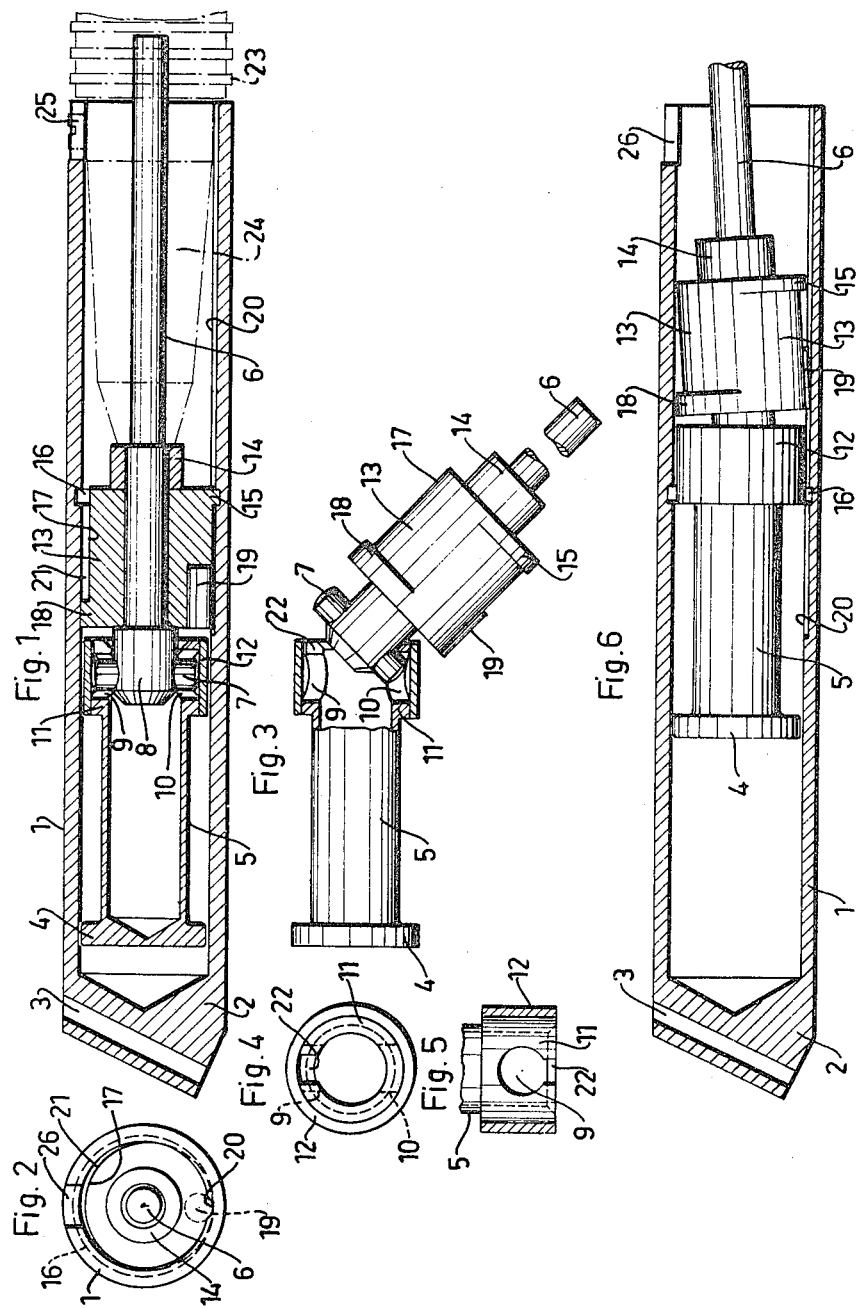

3,199,360
VIBRATORS PARTICULARLY INTENDED
FOR DENTAL USE
Karl Axel Sam Karlstrom, Nygatan 37, Gavle, Sweden, and Karl Gustaf Östberg, deceased, late of Rotebro, Sweden, by Ingrid Johanna Cecilia Allard, Rotebro, Sweden and Elsie Anna Marianne Östberg, Stockholm, Sweden, heirs; said heirs of said Östberg, assignors to said Karlstrom
Filed Mar. 23, 1962, Ser. No. 182,142
4 Claims. (Cl. 74—87)

The present invention refers to vibrators intended especially for dental use and consisting of a rotating pendulum enclosed within a tube. Such vibrators generally operate at high frequencies and are therefore subjected to great strains and wear. The present invention has for its object to increase the durability of the vibrator and to bring about a suitable construction of the vibrator mechanism for the purpose in view. Moreover, the mechanism is such as to permit the various parts thereof to be readily taken apart for inspection and exchange.

Figure 7:
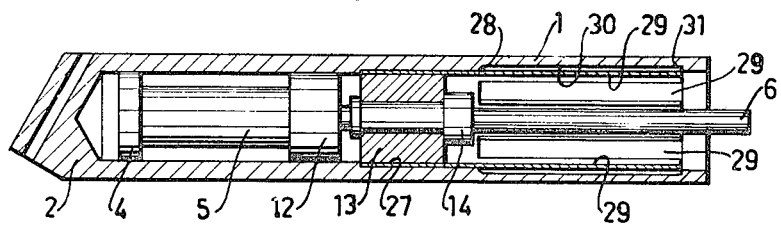
Figure 8:
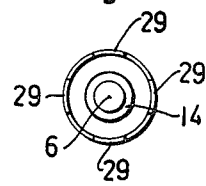
Figure 9:
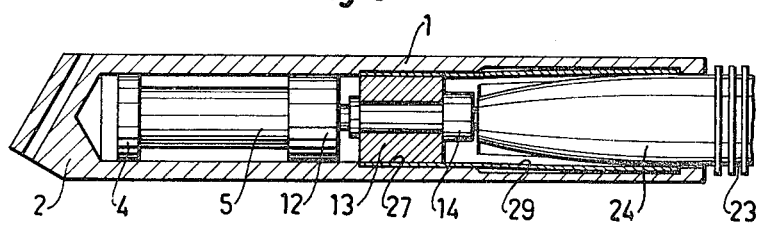
Figure 10:
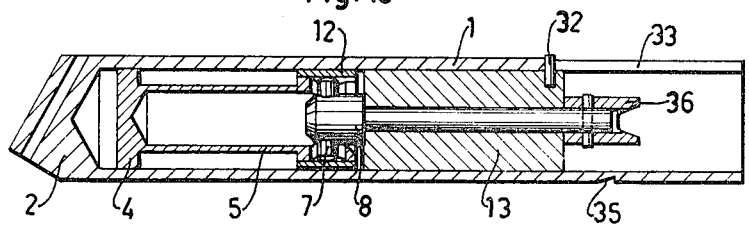

The invention will be described with reference to the accompanying drawings, which illustrate various forms of embodiment of a vibrator intended for dental use. FIG. 1 is a longitudinal section and FIG. 2 an endwise view of a first embodiment of the vibrator. FIG. 3 shows the vibrator mechanism partly in section and with the members thereof in a position to illustrate the method of connecting and disconnecting the same. FIG. 4 is an endwise view and FIG. 5 a horizontal projection of the end portion of the pendulum shown in section in FIG. 3. FIG. 6 illustrates the method of introducing the vibrator mechanism into the vibrator tube. FIG. 7 is a longitudinal section of the vibrator and shows another form of embodiment of the invention. FIG. 8 is an endwise view of an inset sleeve shown in FIG. 7. FIG. 9 shows the construction according to FIG. 7 with the vibrator inset in a locked position. FIG. 10 is a longitudinal section and FIG. 11 a plan view of a further embodiment.

The movable parts of the vibrator are arranged within a cylindrical tube 1 of metal, plastic or some other suitable material. The fore end of the tube serves as a vibrator head 2 intended to carry or to be brought into contact with the object to be vibrated. For this purpose the head may, as shown in FIG. 1, be provided with a boring 3 for attaching the object in consideration. The pendulum is formed at the free end thereof into a rolling body 4 which, when the pendulum rotates, rolls on the inside of the vibrator tube in order thus to transmit vibrations to the tube and the head 2 in known manner. In the example shown, the pendulum rod has the form of a hollow cylinder 5, which is connected to an axle 6 by means of a link coupling arranged within the pendulum rod, said link coupling consisting of a pin 7 extending diametrically through the axle. Said pin is inserted into the thicker end 8 of the axle, and adapted to engage with its end apertures 9, 10, in the thicker end portion 11 of the cylinder 5. Said apertures 9, 10 are closed by means of a sleeve 12 thrust over the end portion 11, the pin 7 being adapted to bear on the inner cylindrical surface of said sleeve by means of its spherically rounded end surfaces. The axle 6 is in the proximity of the inner end of the pendulum rotatably mounted in a pedestal body 13 having a cylindrical surface fitting to the inside of the vibrator tube and inserted between a shoulder on the thicker end portion 8 of the axle and a stop ring 14 arranged on the axle in a manner such that the pedestal body is locked in the axial direction on the axle 6.

In the normal position of the vibrator mechanism shown in FIG. 1 the pedestal body 13 is locked in the axial direction relatively to the tube 1 by a catch 15 engaging an annular groove 16 of the vibrator tube accurately fitting the catch. The catch 15 forms a radial projection from the cylindrical surface of the pedestal body at one end of the latter and has the form of a circular segment eccentrical in relation to the pedestal body, said segment enclasping approximately half of the circumference of said body, as will appear from FIGS. 2 and 3. To facilitate the introduction of the pedestal body and the adhering pendulum into and its removal out of the vibrator tube, the pedestal body 13 is chamferred at the surface portion located diametrically opposite the catch 15, said chamfer forming a cylindrical surface 17, which in the example shown has the same centre as the cylindrical edge surface of the catch 15, as shown in FIG. 2. The chamfer extends over the major portion of the length of the pedestal body. The remaining portion 18 of the pedestal body forms at the opposite end a supporting edge bearing on the inside of the vibrator tube, the cylindrical surface of which forms a portion of the cylindrical surface of the pedestal body bearing on the inside of the vibrator tube 1.

The pedestal body 13 is locked against turning movements relatively to the vibrator tube by means of a catch 19 engaging a longitudinally extending groove 20 in the vibrator tube. This catch is constituted by a cylindrical pin 19 fitted into a boring parallelling the axle of the pedestal body, said boring being so arranged as to form a longitudinally extending slit in the cylindrical surface of the pedestal body, and said pin 19 engaging the groove 20 by means of the portion projecting through the slit outside the cylindrical surface of the pedestal body. The longitudinally extending groove 20 preferably has a cross sectional configuration fitting the pin 19.

When the vibrator mechanism is to be removed from the tube 1, the axle 6 is first raised upwardly so as to form an angle to the axis of the tube, the catch 15 being thus brought out of engagement with the groove 16. This movement is rendered possible by the fact that the pedestal body 13 is chamferred on the side lying opposite the catch 15, so that a space 21 is formed between the chamferred surface and the inside of the vibrator tube. The end portion 18 remaining at the opposite end of the pedestal body has so small an extension in the axial direction that a minimum play is sufficient to prevent bending forces against the inside of the vibrator tube at said portion 18. The axle 6 with the adhering pedestal body and the pendulum may then be pulled out of the vibrator tube. After that, the pendulum may be removed from the axle 6 in the manner shown in FIG. 3, by the fact that the axle may be overturned into an angular position, in which the pin 7 may be loosened from the inner end of the pendulum. This movement is facilitated by the fact that the cylindrical end portion 11 of the pendulum is provided with an open slit 22 extending from the upper aperture 9 toward the edge of said end portion 11, said slit 22 having a width such as to permit the pin 7 to be moved into and out through the same.

When the vibrator mechanism is to be introduced into the tube, the pendulum is first connected to the axle 6 in the manner shown in FIG. 3, the lower end of the pin 7 being first introduced into the aperture 10, after which the upper end is introduced into the aperture 9. The mechanism combined in this manner may then be thrust into the vibrator tube in the manner shown in FIG. 6, the axle 6 and the pedestal body 13 then taking first an inclined position while the catch 19 slides in the groove 20 and the catch 15 bears on the inside of the tube. When the mechanism reaches its proper position, the catch 15 falls into the groove 16, whereby the mechanism is locked in the longitudinal direction. When the axle 6 rotates, the friction between the axle and the pedestal body 13 will exert a turning moment on the pedestal body. While the catch 19 prevents turning of the pedestal body, the latter will be pressed firmly against the inside of the vibrator tube by the fact that the cylindrical pin 19 is pressed against the lateral edges of the groove 20.

When the catch 15 is in engagement with the groove 16, the axle 6 is in its position coaxial to the vibrator tube. In this position the axle and thus the whole vibrator mechanism is locked through the connection of the vibrator to a non-represented outer driving shaft, which is rotatably mounted in a handle 23, which is intended to be introduced into the end of the vibrator tube, the axle 6 being thus guided in a boring in the fore end 24 of the handle. Said handle, the front part of which is shown in FIG. 1 by chain-dotted lines, contains a coupling, preferably in the form of a chuck which, when the handle is pushed in, is brought into a position of engagement relatively to the outer end of the axle 6, and which may be actuated by means of a suitable operating contrivance for the purpose of coupling the axle 6 to the driving shaft located in the handle. The handle 23 may be non-rotatably united with the vibrator tube in any suitable manner, for instance by means of a screw 25 and a slit 26.

When the axle 6 rotates, the pendulum is also rotated through the engagement of the pin 7 with the edges of the apertures 9, 10. During the rotary movement the rolling body 4 is under the influence of the centrifugal force kept in frictional engagement with the inside of the vibrator tube, the same then performing a rolling motion to generate vibrations in the tube. The pendulum is thus subjected to the influence of a component of the centrifugal force acting in the longitudinal direction of the pendulum rod, whereby the insides of the apertures 9, 10 are caused to bear firmly on the ends of the pin 7, which prevents any play between the pin and the aperture edges during the rotation. The oscillatory movement of the pendulum relatively to the end of the axle 6 is rendered possible by the fact that the pin 7 bears on the sleeve 12 with its spherically rounded end surfaces covering the apertures 9, 10. To reduce the wear, a lubricant may be introduced into the apertures 9, 10. By reason of the fact that the coupling 7, 9, 10 is entirely enclosed within the hollow pendulum, lubricant is prevented from finding its way out and from depositing on the part of the inside of the vibrator tube cooperating with the rolling body 4. A contributive circumstance in this connection is that the lubricant has a tendency through the influence of the centrifugal force to find its way into the hollow pendulum rod.

In the form of embodiment shown in FIGS. 7–9, the pedestal body 13 is forced into and connected firmly by friction to an inset sleeve 27, which together with the pedestal body and its adhering pendulum 5 may be pushed into the vibrator tube 1. In its introduced position, the inset sleeve 27 bears on a shoulder 28 on the inside of the tube 1. The inset sleeve 27 is extended rearwardly and slitted so as to form four resilient arms 29. Along these arms the vibrator tube is provided on the inside thereof with a boring 30, into which the arms may be pressed, as shown in FIG. 9, so that the ends of the arms fall in behind a shoulder 31 at the end of the tube 1 in order thus to lock the pedestal body and the whole vibrator inset against displacement outwardly in an axial direction. In FIG. 9, the vibrator inset is thus axially locked in the one direction against the shoulder 28 and in the other direction against the shoulder 31.

The axial locking may be effected by inserting the above-described handle 23 into the end of the vibrator tube, as shown in FIG. 9. The resilient arms 29 are thus bent outwardly by the conical end 24 so as to be pressed firmly between the cylindrical portion of the handle 23 and the inside of the boring 30, and so as to be brought into locking position relatively to the shoulder 31. The pedestal body is then locked against a turning movement, first, by the frictional engagement between the handle end 24, the arms 29 and the tube 1, and, second, through the engagement of the screw 25 into the slit 26. The handle is then locked firmly to the vibrator tube by tightening of the chuck located in the handle about the end of the axle 6.

Figure 11:
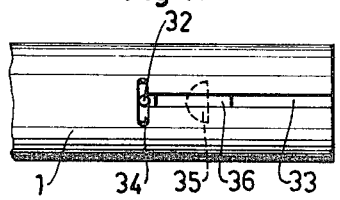

In the embodiment shown in FIGS. 10 and 11, locking of the pedestal body 13 is effected by means of a pin 32 arranged thereon and a cooperating slit 33 in the vibrator tube 1. The length of the slit is so adapted that the pedestal body is stopped in its proper position by the fact that the pin is caused to bear on the bottom of the groove. During the rotary movement the pedestal body is retained in its pushed-in position by the axial component of the centrifugal force, which tends to press the pin 32 against the bottom of the groove. Through the frictional forces caused by the rotary movement the pedestal body is turned by a small angle, until it is stopped by the fact that the pin 32 is caused to bear on the bottom of a transverse slit 34, which extends in both directions from the end of the longitudinal slit, so that the pedestal body may be turned in the one or the other direction depending on the direction of the rotation. By said contrivance the pedestal body is locked against a turning movement during the rotation while being locked at the same time against displacement in the axial direction. By means of a claw-coupling 36, the vibrator axle may be connected in known manner to an outer driving shaft, which is introduced through the end of the vibrator tube, the connector being thus locked in the connected position by means of a resilient pawl engaging a notch 35 of the vibrator tube.

What is claimed is:

1. A vibrator for dental use, comprising a vibrator tube closed at one end and open at the other end, a rotary axle coaxially arranged within said tube, a rotary pendulum arranged within the tube and pivotally connected with said axle so as to rotate together with the axle, a surface of revolution inside the tube forming a rolling surface for the outer end of the pendulum, a cylindrical pedestal body (13) forming a bearing for said axle and slidable axially in the tube so that said pedestal body together with said axle and pendulum is insertable and removable axially through the open end of said tube, a recess in the inner surface of said tube, a locking member on said pedestal body and movable radially into engagement with said recess to lock the pedestal body axially in its operative position, and means for releasably holding said locking member in engagement with said recess comprising a detachable coupling member for connecting said axle to a driving shaft, said coupling member being detachably inserted in the open end of said tube and, when inserted, holding said locking member in engagement with said recess and thereby locking said pedestal body axially in its operative position.

2. A vibrator as claimed in claim 1, in which the locking member (15) consists of a radial projection from the cylindrical surface of the pedestal body (13) at one end thereof, the pedestal body being chamferred at the surface portion (17) located diametrically opposite to said radial projection, so as to allow the pedestal body to be introduced into the vibrator tube in a position inclined relative to the tube, and in which said coupling member, when inserted, holds said axle and pedestal body in alignment with said tube and thereby holds said radial projection in said recess.

3. A vibrator as claimed in claim 1, in which the locking member (15) consists of a radial projection from the cylindrical surface of the pedestal body forming an eccentric circular segment extending approximately half the circumference of the pedestal body, and fitting, in its locking position, into said recess which is in the form of an annular groove in the inside surface of the vibrator tube.

4. A vibrator as claimed in claim 1, in which the locking member consists of at least one resilient arm (29) extending from the pedestal body towards the open end of the vibrator tube and having a free end portion movable radially into locking engagement with said recess, said coupling member, when inserted engaging said arm to hold it in locking engagement with said recess.

References Cited by the Examiner

UNITED STATES PATENTS

| | | | |
|---|---|---|---|
| 955,339 | 4/10 | Lumsden | 74—87 X |
| 1,947,965 | 2/34 | Beggs | 64—8 |
| 2,098,675 | 11/37 | Procunier | 279—49 |
| 2,194,410 | 3/40 | Svenson | 74—87 |
| 2,309,033 | 1/43 | Baily | 74—87 |
| 2,460,216 | 1/49 | Dalton | 64—8 |
| 2,679,384 | 5/54 | Livingston et al. | 74—87 |
| 3,081,980 | 3/63 | Karlstiom | 74—87 X |

FOREIGN PATENTS

| | | |
|---|---|---|
| 1,095,562 | 12/60 | Germany. |
| 147,496 | 5/61 | Russia. |

BROUGHTON G. DURHAM, *Primary Examiner.*